United States Patent
Naslund et al.

(10) Patent No.: US 8,885,831 B2
(45) Date of Patent: Nov. 11, 2014

(54) MANAGING USER ACCESS IN A COMMUNICATIONS NETWORK

(71) Applicant: Telefonaktiebolaget L M Ericsson (publ), Stockholm (SE)

(72) Inventors: Mats Naslund, Bromma (SE); Jari Arkko, Kauniainen (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/912,377

(22) Filed: Jun. 7, 2013

(65) Prior Publication Data

US 2014/0023194 A1   Jan. 23, 2014

Related U.S. Application Data

(63) Continuation of application No. 12/520,476, filed as application No. PCT/EP2006/069906 on Dec. 19, 2006, now Pat. No. 8,462,947.

(51) Int. Cl.
| | |
|---|---|
| *H04W 12/02* | (2009.01) |
| *H04L 29/06* | (2006.01) |
| *H04W 12/04* | (2009.01) |
| *H04W 12/06* | (2009.01) |
| *H04W 80/04* | (2009.01) |

(52) U.S. Cl.
CPC .............. *H04W 12/04* (2013.01); *H04L 63/067* (2013.01); *H04L 63/062* (2013.01); *H04L 63/08* (2013.01); *H04W 80/04* (2013.01); *H04L 63/0892* (2013.01); *H04W 12/06* (2013.01); *H04L 63/162* (2013.01)
USPC .......................................... 380/270; 713/168

(58) Field of Classification Search
USPC .......................................... 380/270; 713/168
See application file for complete search history.

(56) References Cited

U.S. PATENT DOCUMENTS

| | | | |
|---|---|---|---|
| 6,023,689 A | 2/2000 | Herlin et al. | 705/67 |
| 2001/0052083 A1 | 12/2001 | Willins et al. | 713/201 |

(Continued)

FOREIGN PATENT DOCUMENTS

| | | |
|---|---|---|
| EP | 1672945 A1 | 6/2006 |
| WO | 2005064973 A1 | 7/2005 |

OTHER PUBLICATIONS

Zheng, X., et al., "A Dual Authentication Protocol for IEEE 802.11 Wireless LANs", Wireless Communication Systems, 2005, 2nd International Symposium on Siena, Italy, Sep. 5-9, 2005, Piscataway, NJ, USA, IEEE, Sep. 5, 2005, pp. 565-569, XP010886317.

(Continued)

*Primary Examiner* — Techane Gergiso
(74) *Attorney, Agent, or Firm* — Rothwell, Figg, Ernst & Manbeck, P.C.

(57) ABSTRACT

A method of operating a node for performing handover between access networks wherein a user has authenticated for network access in a first access network. The method comprises receiving from a home network a first session key and a temporary identifier allocated to the user for the duration of a communication session. The identifier is mapped to the first session key, and the mapped identifier and key are stored at the node. A second session key is derived from the first session key and the second session key is sent to an access network, and the identifier sent to a user terminal. When the user subsequently moves to a second access network, the node receives the identifier from the user terminal. The node then retrieves the first session key mapped to the received identifier, derives a third session key and sends the third session key to the second access network.

10 Claims, 4 Drawing Sheets

(56) References Cited

U.S. PATENT DOCUMENTS

| | | | |
|---|---|---|---|
| 2002/0076054 A1 | 6/2002 | Fukutomi et al. | 380/277 |
| 2003/0051140 A1* | 3/2003 | Buddhikot et al. | 713/169 |
| 2004/0077335 A1 | 4/2004 | Lee et al. | 455/410 |
| 2004/0236939 A1 | 11/2004 | Watanabe et al. | |
| 2005/0250539 A1 | 11/2005 | Veron | |
| 2005/0273513 A1* | 12/2005 | Panasyuk et al. | 709/228 |
| 2006/0104247 A1 | 5/2006 | Dommety et al. | 370/338 |
| 2007/0060127 A1 | 3/2007 | Forsberg | 455/436 |
| 2007/0110009 A1* | 5/2007 | Bachmann et al. | 370/338 |
| 2007/0258594 A1 | 11/2007 | Sandhu et al. | 380/277 |

OTHER PUBLICATIONS

Lin, H., et al., "Authentication in Wireless Communications", Global Telecommunications Conference, 1993, Including a Communications Theory Mini-Conference, Technical Program Conference Record, IEEE in Houston, Globecom '93, IEEE Houston, TX, USA Nov. 29-Dec. 2, 1993, New York, NY, USA, IEEE, Nov. 29, 1993, pp. 550-554, XP010109722.

Office Action on Apr. 20, 2012 in Japanese Application No. 2009-541777, 3 pages.

* cited by examiner

MANAGING USER ACCESS IN A COMMUNICATIONS NETWORK

This application is a continuation of U.S. application Ser. No. 12/520,476 (published as U.S. 20090313466), which is a 35 U.S.C. §371 National Phase Application of PCT/EP2006/069906, filed Dec. 19, 2006, and designating the United States. The above identified applications and publications are incorporated by reference herein.

TECHNICAL FIELD

The present invention relates to managing user access in a communications network.

BACKGROUND

When a user involved in an ongoing session in a network moves between access networks, a handover from one access network to another is required. This handover can be between different types of access network (for example, mobile networks may include GSM or WCDMA, and fixed line networks may include WLAN, WiMAX, xDSL). The handover should be as efficient as possible to allow the session to continue with minimal disruption to the user. However, it is also important that during and after a handover, security is maintained and only the authenticated user can access the session. When a user moves between access networks, it is required that the user is re-authenticated in the new access network. This ensures that charging of the user is correct, and reduces the risk of a session being hijacked by a malicious third party during handover.

The Extensible Authentication Protocol (EAP) is a protocol used in many different types of wireless networks and Point-to-Point networks, and is a universal authentication framework (see RFC 3748). EAP is not an authentication mechanism, but an authentication framework that provides common functions for the authentication mechanism. In this specification, EAP refers to various different EAP protocols such as EAP-AKA (EAP Authentication and Key Agreement for UMTS Subscriber Identity Module), EAP-SIM (EAP for GSM Subscriber Identity Module), and EAP TLS, etc.

As currently specified, EAP is an end-to-end protocol between the peer (user) and a so-called authenticator (the entity desiring to authenticate the user). While the role of authenticator may reside in an entity other than the user's home authentication server, the user's home authentication server still needs to be involved as a "back-end". This is because EAP does not require that the authenticator "understands" the actual EAP authentication method. This intelligence is assumed to be present only in the user's home authentication server which holds a copy of the necessary authentication data/user credentials, etc. Consequently, a full EAP authentication can only be performed by involving the user's home network, and requires a great deal of signalling between the client terminal and the home network, as illustrated in FIG. 1. FIG. 1 does not show the typical presence of one or more proxies between the WLAN Access Network (AN) and the Access, Authorisation and Accounting (AAA) server. This can make the authentication process after a handover to a new access network slow and noticeable to the user. EAP also provides a "fast re-authentication" procedure, as illustrated in FIG. 2, but again this requires signalling-intensive communication with the user's home network, and as can be seen in FIG. 2, the reduction in signalling overhead is not dramatic. At typical round-trip-times (RTT), say 100 ms transatlantic RTT, even fast re-authentication could cause a noticeable disturbance in an on-going service when a user switches from one AN to another. There is a need to improve the efficiency of authentication when a user moves between access networks.

Inter-access hand-overs are typically managed in one of two ways: network centric or terminal centric. In the network centric approach, the network has significant "knowledge" of the different accesses attached and can therefore perform a so-called "smart" hand-over. For instance, the network can detect that a terminal would be better served using a different access network, and can therefore perform a prepared handover. The terminal moves between access networks on the instructions of the network and, more importantly, the network expects the presence of the terminal on the new access network. For instance, the terminal identity and associated key(s) have already been determined. Existing 3GPP-specific accesses such as UTRAN and GERAN are examples of network centric handovers. A drawback of network centric handovers is that different access networks need to be tightly integrated with the network.

An article XINLIANG ZHENG ET AL: "A Dual Authentication Protocol for IEEE 802.11 Wireless LANs", 5 Sep. 2005, discusses the problem of vulnerability of IEEE 802.11 wireless LANs in which a compromised access point can still authenticate itself to a wireless station and gain control over the connection. A protocol is therefore suggested that provide authentication for both wireless stations and access points during both an initial connection stage and a roaming situation.

An article HUNG-YU LIN ET AL: "Authentication in Wireless Communications", 29 Nov. 1993, discloses two authentication protocols to provide services such as message confidentiality, caller ID confidentiality, call intractability and fraud control.

SUMMARY

There is a need to allow a user terminal to identify itself in order to be authenticated in a new access network, that doesn't require the access network to communicate with the user's home network, avoids complex transfer of information between access networks and maintains user privacy.

According to a first aspect of the present invention, there is provided a method of operating an authentication proxy in a visited network for performing handover between access networks wherein a user has authenticated for network access in a first access network. The method comprises: receiving from a home network a first session key and an identifier, which is temporary and access independent, allocated to the user for the duration of a communication session; mapping the identifier to the first session key and storing the mapped identifier and key at the authentication proxy; deriving a second session key from said first session key; sending the second session key to an access network, and the identifier to a user terminal; subsequently receiving from the user terminal via a second access network, in relation to a handover request, the identifier; retrieving the first session key mapped to the received identifier; deriving a third session key from said first session key; and sending the third session key to the second access network.

The first, second, and third session keys may be the same session key. Alternatively, the second and third session keys sent to an access network are from plurality of session keys derived from the first session key, each session key of said plurality of session keys being unique to an access network of a plurality of access networks. This allows session keys to be unique to an access network, so that if the security of a session key is compromised in one access network, it may not be compromised in other access networks.

The identifier may be an Extensible Authentication Protocol key identifier.

The method may further comprise deriving a plurality of identifiers from the received temporary identifier using a hash chain.

The method may comprise the step of receiving a plurality of temporary identifiers, and mapping each of the plurality of temporary identifiers to the first session key.

It is preferred that the identifier is sent from the home network to the authentication proxy using Diameter Protocol signalling. Furthermore, the identifier may include access authorisation information.

According to a second aspect of the invention, there is provided an Authentication proxy for use in a visited communications network in which a user is authenticated for access in a first access network, the Authentication proxy comprising: a receiver for receiving a session key and an identifier, which is temporary and access independent, allocated to the user terminal; mapping means for mapping the identifier to the session key; a memory for storing the mapped identifier and the session key at the authentication proxy; a transmitter for sending the session key to an access network, and the identifier to a user terminal; authentication means for comparing an identifier received from the user terminal with the mapped identifier stored in the memory, and making an authentication decision in connection to a handover request on the basis of the corresponding session key.

According to a third aspect, there is provided a user terminal for use in a communications network comprising: means for generating a session key as result of authentication and key agreement; a receiver for receiving over a first access network an identifier, which is temporary and access independent, associated with said session key; a memory for storing the session key and the received identifier; a transmitter for sending a request for handover to a second access network when the user terminal has moved to the second access network, the request including the identifier.

The approach described above is terminal centric. The terminal monitors its environment for different access networks and, when desired, requests a handover. Unlike network-centric handovers, the network has no prior knowledge that the terminal will show up on the new access network, that is to say the terminal shows up "unexpectedly". In a general multi-access setting (where it may be desired to subsequently introduce as-yet uninvented access technologies) it may be simpler to put the logic that controls a handover into the end-terminals in a terminal centric approach. It is of course still desired to make the handovers as smooth as possible, which is an objective of the present invention.

DETAILED DESCRIPTION

Figure 1:
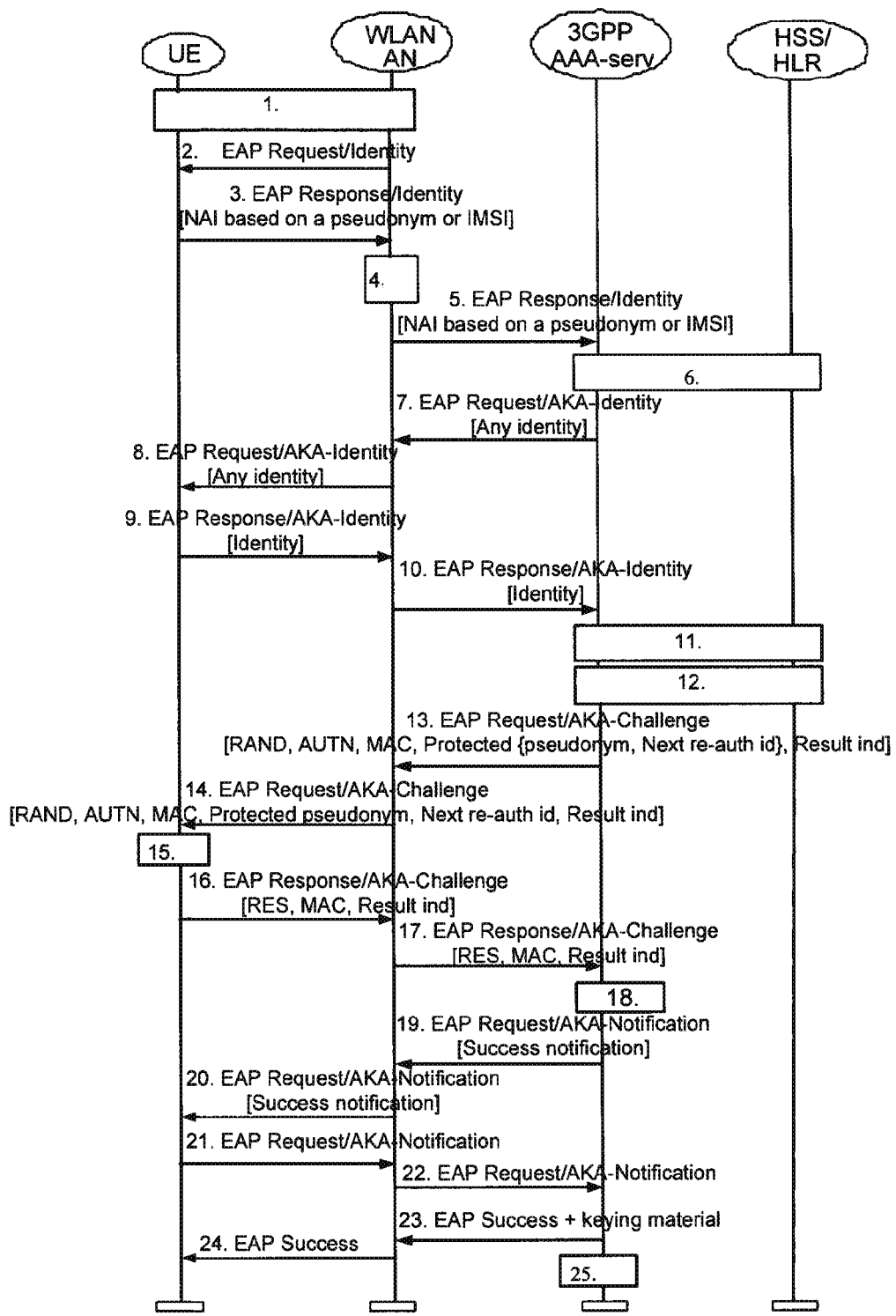
FIG. 1 illustrates the signalling required to authenticate a client in a network using an Extensible Authentication Protocol.
Figure 2:
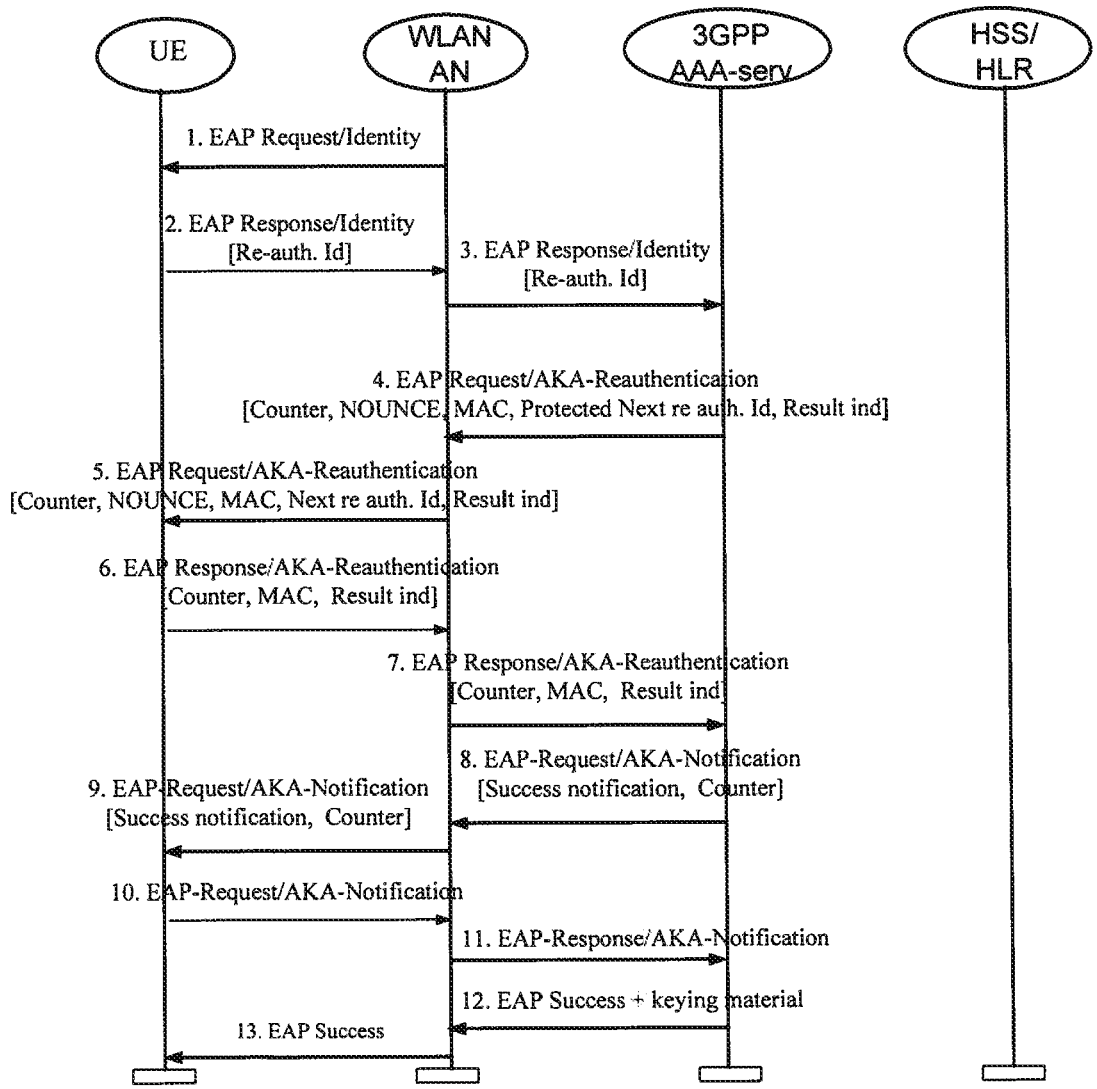
FIG. 2 illustrates the signalling required for fast re-authentication of a client using an Extensible Authentication Protocol.

In a terminal centric approach to access network handovers, the following high level steps of a typical handover procedure apply: (1) The terminal is attached (and authenticated) in a first access network. (2) The terminal detects a preferred access network, e.g. by radio measurement, advertisement from the network side, etc. (3) The terminal sends a handover request on the new access network. (4) The terminal is authenticated over the new access network in order to authorize the handover. (5) If authorized, the handover proceeds by allocating resources for the terminal etc. (6) The old access is typically terminated.

If the terminal had an ongoing session in step 1 it is desirable to let that session continue while the other steps are performed, and the session is then moved to the new access network, i.e. using a "make-before-break" approach. Nevertheless, it is still possible that the session will suffer due to the latency of e.g. step 4. In general, it cannot be assumed that make-before-break is possible as the old access may lose radio coverage during the procedure and so the overhead of e.g. step 4 should be minimized.

One way to improve authentication is to rely on implicit authentication where the terminal/user proves knowledge of a secret shared key. Many EAP methods, e.g. EAP AKA (see RFC 4187), provide a session key to an authenticated user in a network, and a copy of the key to an AAA client in the access network (often via a AAA proxy) in which the user authenticates. When a user moves to a new access network, by proving that he has knowledge of this key, the user can in principle be authenticated. In order for this to work, the target access network must obtain a copy of the same key from the user's profile stored in the user's home network (or, from the source access network), so that a comparison can be made between the key provided by the user and the key stored in the user's profile. However, the access network may simultaneously have many users attached (or about to attach via hand-over), each user having a corresponding key. The user must therefore provide an already known and access-independent identity to the new access network, in order to provide this to the home network as an "index" to retrieve the correct user profile/key.

There are at present no stable access independent identifiers that can be used for this purpose. Access, Authorisation and Accounting (AAA) session identities are stable and known to the network, but not to the user terminal, and so the user terminal cannot provide this identity to the network. Even if these identifiers are made available to the user/terminal, their stability would cause user privacy problems in terms of lost anonymity and traceability. There are also "Key identifiers" in prior art, which are either connected to AAA functions and therefore not known to the user terminal, or are access technology specific (e.g. WLAN/802.11 key-identifiers based on 802.11 MAC address) and so cannot be relied upon if a user is moving between access networks that use different access technologies (where e.g. the MAC address is different). Stable EAP user identities are known only to the user and the home network, and so cannot be used by the access network. Static user identities such as International Mobile Subscriber Identity (IMSI) cannot be used for security (privacy) reasons.

Figure 3:
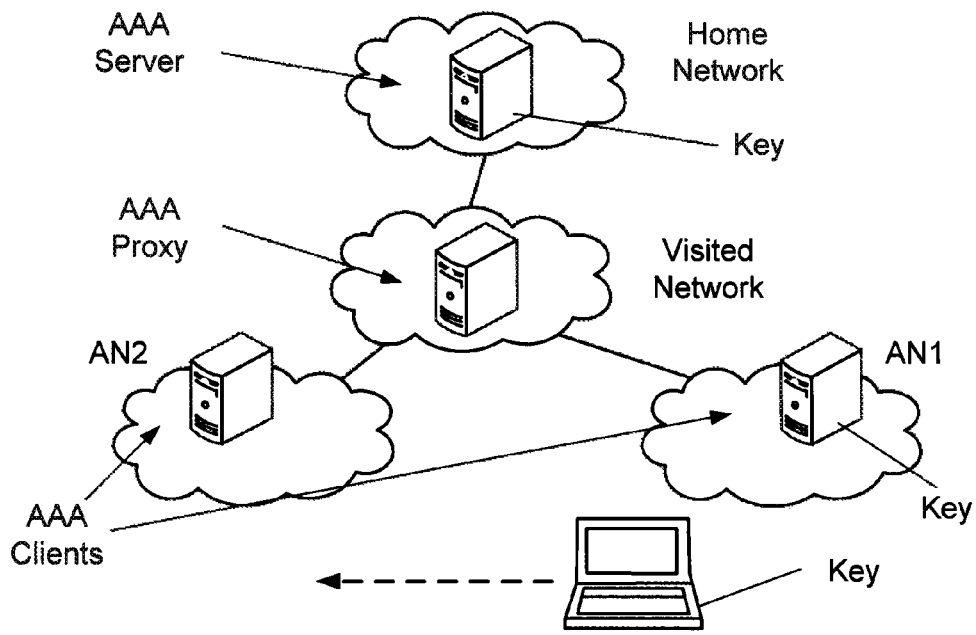
FIG. 3 illustrates schematically a home network, a visited network and two access networks.

The problem referred to above is illustrated in FIG. 3. The user terminal is provided with a key, and is authenticated over access network AN1. This creates "state" in the network, that is to say the network has knowledge of the key provided to the terminal. In addition to being stored in the user terminal, the key is also known to the Home AAA server in the user's home network and the AAA client in the access network AN1. When the terminal moves to another access network AN2, the only way to authenticate the user terminal is to either perform a full EAP authentication or an EAP re-authentication, which requires signalling between the access network and the user's home network, or to transfer the key stored in the AAA client in AN1 to the visited network, and then to AN2 in order for AN2 to make a comparison between the key provided by the user terminal and the key known to the network. In either case, the signalling can be slow, and in the second case it is not clear how the user terminal presents itself to access network AN2 in order for the correct key to be retrieved. In theory, the terminal could present the MAC address used in the old AN1, but that could compromise the privacy of the session.

According to one embodiment of the invention, the Extensible Authentication Protocol (EAP) is used to authenticate a user. EAP includes several different protocols, and the term is used herein to refer to any EAP method that produces keys, such as EAP-AKA (EAP Authentication and Key Agreement using UMTS Subscriber Identity Module), EAP-SIM (EAP for GSM Subscriber Identity Module), EAP TLS, etc.

The EAP framework is based on a generic request-response paradigm. The authenticator issues requests to which the terminal/user provides responses. (The authenticator entity may or may not be co-located with the authentication server entity.)

As an example of an EAP method, EAP AKA (or EAP SIM) works on a high level as follows: 1. If the user terminal identity is not known during authentication (or, if the initially provided identifier is not recognized), the user's home AAA server requests an identity from the user terminal and the user terminal responds by providing an identity.

2. A request-response authentication negotiation takes place between the home AAA server and the user terminal as follows. 3. An EAP AKA challenge request is sent from the home AAA server to the user terminal. 4. The user terminal generates an EAP AKA challenge response using a Subscriber Identity Module (SIM or USIM) and returns this to the home AAA server. 5. The Home AAA server checks the response from the user terminal and, if the response agrees, notifies the user terminal of success. At this point, the user terminal uses a local key-derivation to derive the session key. A copy of the same session key is known in the AAA server and can be forwarded to a AAA client in the access network in order to perform security functions such as encryption.

The communication between the user terminal and the home AAA server passes via an AAA proxy in the visited network. The proxy is present for AAA message routing purposes and the visited network does not use any information contained in this signalling, as it is not normally useful. The AAA proxy simply encapsulates the EAP messages from the user terminal using, for example, Diameter protocol before forwarding them to the home AAA server, and similarly de-encapsulated the messages from the home AAA server before forwarding them to the user terminal, for example using EAP over LAN (EAP OL).

When the EAP challenge is sent from the home AAA server to the user terminal, as required by step 3 above, the home AAA server may also send (end-to-end encrypted) EAP specific identifiers to the user terminal, such as pseudonyms and re-authentication IDs. The identifiers are in a Network Access Identifier (NAI) format such as "id@domain", and are encrypted to ensure that they are not visible in the visited network. According to the invention a new type of EAP identifier, denoted multi-access ID (MID), is introduced into the EAP and AAA signalling. First, an MID is generated at the AAA-server and sent to the user terminal within the EAP messages in an encrypted form to maintain security. The user terminal can detect whether an MID has been sent to it, for example by negotiating a special version of EAP in step 1 above or making sure that an MID is distinguishable from other types of identity. An MID can be distinguishable by, for example, ensuring that an MID starts with a special character such as the letter "M". The content of the MID is simply a random string that has no relation to the "real" user ID, and can thus preserve the privacy of the user. The user terminal now has an anonymous and stable identity, which can be used later if required during a handover.

The MID must also be made known to the visited network. To this end, the MID is, simultaneously to sending the EAP message, sent using Diameter signalling from the home AAA server to the AAA proxy in the visited network. There are existing provisions for using key identifiers in Diameter signalling. For EAP, the so-called "MSK ID" attribute can be used in a Diameter message. The MSK ID attribute is populated with the associated MID in the home AAA server before sending the Diameter message. Another option is to use the CUI (chargeable user ID) field. The AAA proxy detects the presence of the MID in the AAA signalling, and stores a copy of it, together with the associated key for later use. The AAA proxy has in effect been made "stateful" and therefore has a stable user identity that can be used in later user authentication.

Notice that due to the way the MID is communicated within the EAP and AAA protocols, only three entities will know the MID: the user terminal, the visited network (AAA proxy), and, of course, the user's home AAA server.

Concurrently with step 5 above, the home AAA server sends a derived session key, using Diameter signalling to the AAA proxy. The AAA proxy forwards the session key to the AAA client in the access network. According to the present invention, the AAA proxy in the visited network keeps a copy of the session key, making the key available at an "access independent" location, for use in a future handover to AN2. The key is mapped to the MID at the AAA proxy in the visited network.

Figure 4:
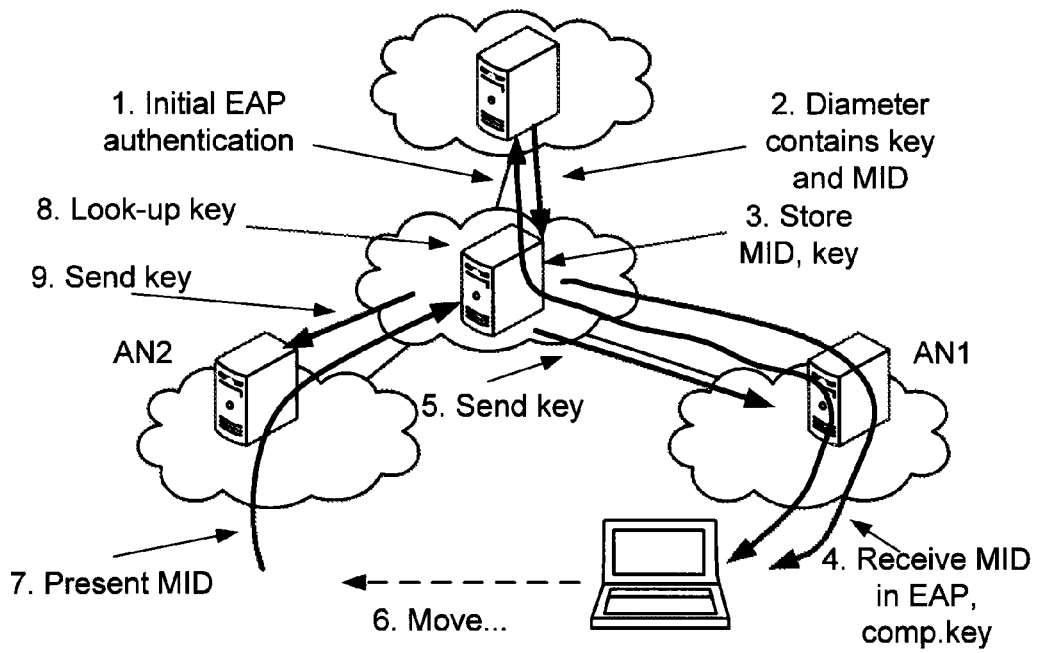
FIG. 4 illustrates the signalling required to authenticate a user when the user moves from one access network to another according to a preferred embodiment of the invention.

By using the steps above, a user can be authenticated in a new access network without the need to signal the user's home network. Referring to FIG. 4, the new protocol can be summarised as follows: 1. The user terminal is authenticated in the network using EAP, and has access to access network AN1. 2. A key and an MID are created in the Home AAA server, and then sent to the AAA proxy in the visited network as part of AAA signalling. 3. The key and MID are stored at the AAA proxy. 4. The AAA proxy forwards the EAP message containing the MID to the user terminal. 5. The AAA proxy sends the session key to access network AN1, but not the MID. The user terminal is now authenticated and can have (secured) communication in AN1. 6. At some later point, the user terminal moves to a new access network, AN2. 7. The user terminal sends its MID to AN2. 8. Access network AN2 queries the AAA proxy in the visited network to look up the key associated with MID. 9. The key is returned from the AAA proxy to the access network AN2.

If the key returned to the access network does not match the corresponding key stored in the user terminal, then errors will occur when the user attempts to communicate in the new access network. Specifically, encryption and/or data integrity will fail since the keys do not match. This means that an impersonator of the authentic user terminal, not knowing the key corresponding to the MID, can be detected as unauthorized and service can be denied. Only the same terminal that previously authenticated over AN1 will receive service over AN2. In addition to providing a shared key for a user this procedure also provides an indirect way of authenticating the user in the new access network.

In order to preserve user privacy, a given MID is only used once. The MID is sent in the clear over AN2, so if it is re-used, the privacy of the user may be compromised as a $3^{rd}$ party will be able to compare observed MIDs and verify that it is the same user, thereby providing a means of tracking the user. In order to get round this problem, the home AAA server may send a "batch" of random, unique MIDs, all associated with the same key. For instance, if N such MIDs map to the same key, the user/terminal could change access N times before the home AAA is required to generate new MIDs. Alternatively, a hash chain could be used, i.e. a "base" MID identifier, M0, is sent in an initial message and subsequent MIDs are defined by hashing the previous one, i.e. next_MID=hash(previous_MID). This allows the terminal and the AAA proxy to locally derive subsequent, fresh MIDs while the home AAA server only needs to provide M0. Note that the user privacy/ untraceability obtained by this approach is not complete, as a $3^{rd}$ party, having seen one MID, could apply the hash function and link MIDs in the chain to each other. Using the hash chain in reverse order does not help.

If the access network deploys public key cryptography, then the MID can be re-used several times by protecting it (encrypting) with the public key of the access network. This is, however, a more complex and expensive solution.

Figure 5:
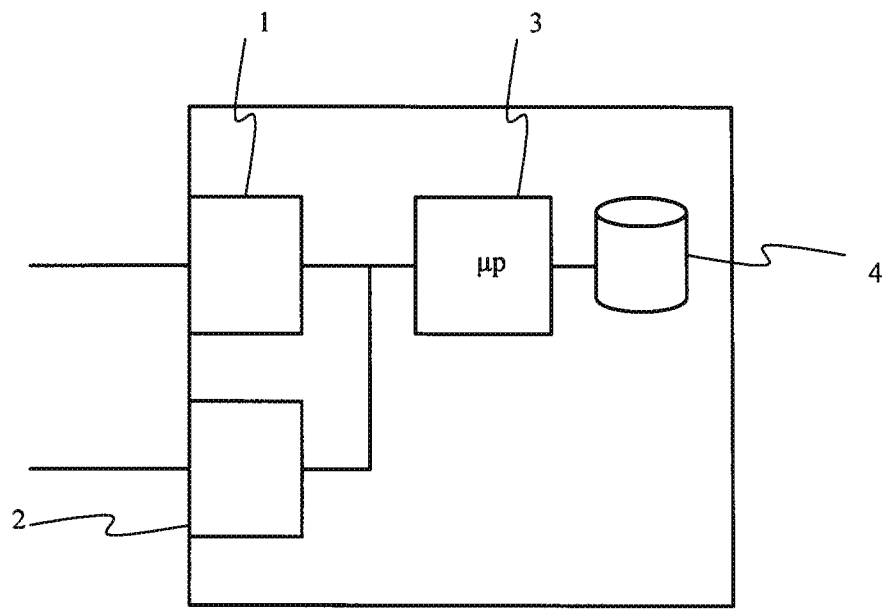
FIG. 5 illustrates schematically an Authentication proxy for use in a communications network according to one embodiment of the invention.

The AAA proxy is illustrated schematically in FIG. 5. The AAA proxy requires a receiver 1 and a transmitter 2 in order to transmit and receive data. A microprocessor 3 is required in order for the AAA proxy to map the key to the identifier, and a memory 4 is also required in order to store the mapped key and identifier.

Figure 6:
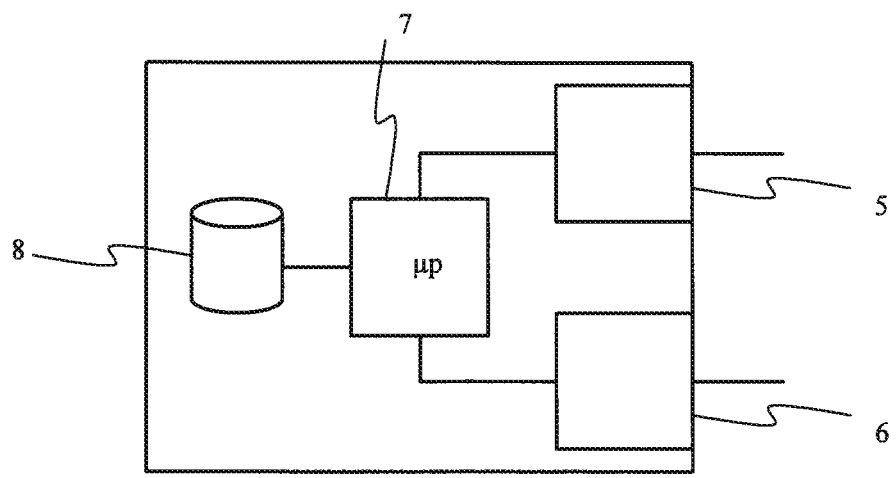
FIG. 6 illustrates schematically a user terminal for use in a communications network according to one embodiment of the invention.

A user terminal, as illustrated schematically in FIG. 6, also requires a transmitter 5 and a receiver 6 in order to transmit and receive data. A microprocessor 7 is also required, and a memory 8 for storing a session key and an identifier.

The invention may be enhanced by not sending keys directly to the access networks AN1 and AN2. The key may be stored only in the AAA proxy, and access-specific keys are derived for the access networks as follows: key1=hash(key, AN1), key2=hash(key, AN2), etc, where ANj is some unique information for access network ANj, e.g. an identifier. This means that even if, for example, key1 is compromised in AN1, then key2 in AN2 is still safe.

The invention can be further enhanced to ensure that the user can only use certain "allowed" accesses. For example, a user's subscription may allow him to use a WLAN access network, but not a WiMAX access network. To accomplish this, bits of the MID are used. The j:th bit of the MID is set to "1" if, and only if, the j:th access type is allowed. This provides a way for the home network to delegate authorisation to the visited network: the user terminal will only be allowed to use those accesses. If the user terminal generates a fraudulent MID with a "1" bit set, then either the AAA proxy will not have the fraudulent MID registered, or the fake MID may be registered but associated with a key that is not known to the user terminal. In either case the user terminal will not be able to obtain access.

The invention provides for a fast hand-over of a terminal moving between access networks using a terminal-centric approach. By using an access independent identifier that is not linked to a long-term static user ID, effective hand-over between networks is possible with little support required from the home network.

It will be appreciated by the person of skill in the art that various modifications may be made to the above described embodiments without departing from the scope of the present invention.

The invention claimed is:

1. A method performed by a wireless communication device (WCD), comprising:
   generating, by the WCD, a first session key;
   receiving, by the WCD, a temporary identifier allocated to the WCD for the duration of a communication session, wherein an authentication server stores a copy of the first session key and the temporary identifier so that the temporary identifier is mapped to the first session key;
   using, by the WCD, the first session key to encrypt first data;
   sending, by the WCD, the encrypted first data encrypted using the first session key to a first access point that has its own copy of the first session key or a key derived from the first session key;
   as part of a handover from the first access point to a second access point, the WCD sending to the second access point the temporary identifier, thus enabling the second access point to obtain from the authentication server a copy of the first session key or a key derived from the first session key;
   after sending to the second access point the temporary identifier, the WCD using the first session key to encrypt second data; and
   the WCD sending the encrypted second data encrypted using the first session key to the second access point.

2. The method of claim 1, wherein using the first session key to encrypt the first data comprises deriving a first derived session key from the first session key and encrypting the first data using the first derived session key.

3. The method of claim 2, wherein deriving the first derived session key comprises using the first session key and an identifier associated with the first access point to derive the first derived session key.

4. The method of claim 3, wherein using the first session key to encrypt the second data comprises deriving a second derived session key from the first session key and encrypting the second data using the second derived session key.

5. The method of claim 4, wherein deriving the second derived session key comprises using the first session key and an identifier associated with the second access point to derive the second derived session key.

6. The method of claim 1, further comprising:
   the WCD receiving a second temporary identifier, wherein the authentication server maps the second temporary identifier to the first session key;
   as part of a handover from the second access point to a third access point, the WCD sending to the third access point the second temporary identifier, thus enabling the third access point to obtain from the authentication server a copy of the first session key or a key derived from the first session key;

after sending to the third access point the second temporary identifier, the WCD using the first session key to encrypt third data; and the WCD sending the encrypted third data encrypted using the first session key to the third access point.

7. The method of claim 1, further comprising:

as part of handover from the second access point to a third access point, the WCD sending to the third access point a derived identifier derived from the firs temporary identifier, thereby enabling the third access point to obtain a copy of the first session key from the authentication server;

after sending to the third access point the derived identifier, the WCD using the first session key to encrypt third data; and the WCD sending the encrypted third data encrypted using the first session key to the third access point.

8. The method of claim 1, wherein the temporary identifier is generated by an authorization server in the home network.

9. The method of claim 1, wherein the temporary identifier comprises a random or pseudo-random character string.

10. A user terminal, comprising:

a receiver;

a transmitter;

a processor; and a memory, said memory containing instructions executable by said processor wherein said user terminal is configured to:

generate a first session key;

store a temporary identifier received from an authentication server that stores a copy of the first session key and the temporary identifier so that the temporary identifier is mapped to the first session key;

use the first session key to encrypt first data;

send the encrypted first data encrypted using the first session key to a first access point that has its own copy of the first session key or a key derived from the first session key;

send to a second access point, as part of a handover from the first access point to the second access point, the temporary identifier, thus enabling the second access point to obtain from the authentication server a copy of the first session key or a key derived from the first session key;

use the first session key to encrypt second data; and use the transmitter to send the encrypted second data encrypted using the first session key to the second access point.

* * * * *